United States Patent
Igarashi et al.

(10) Patent No.: US 6,883,324 B2
(45) Date of Patent: Apr. 26, 2005

(54) CONTROL APPARATUS AND CONTROL METHOD FOR INTERNAL COMBUSTION ENGINE

(75) Inventors: Osamu Igarashi, Susono (JP); Koichi Akita, Susono (JP); Shoji Sasaki, Mishima (JP); Hiromasa Hashimoto, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/802,946

(22) Filed: Mar. 18, 2004

(65) Prior Publication Data

US 2004/0194767 A1 Oct. 7, 2004

(30) Foreign Application Priority Data

Apr. 3, 2003 (JP) ........................................ 2003-100590

(51) Int. Cl.[7] .......................... F02B 33/44; F02B 37/04
(52) U.S. Cl. ............................. 60/608; 60/612; 123/564
(58) Field of Search ............................... 123/564–565; 60/607–609, 612; F02B 37/04

(56) References Cited

U.S. PATENT DOCUMENTS

| | | | | |
|---|---|---|---|---|
| 4,498,429 A | * | 2/1985 | Satow et al. ................. | 123/564 |
| 4,589,396 A | * | 5/1986 | Tokushima et al. ......... | 123/564 |
| 5,427,079 A | * | 6/1995 | Andrepont et al. ......... | 123/564 |
| 6,062,026 A | | 5/2000 | Woollenweber et al. ...... | 60/612 |
| 6,079,211 A | * | 6/2000 | Woollenweber et al. ...... | 60/608 |
| 6,688,104 B2 | * | 2/2004 | Baeuerle et al. .............. | 60/608 |

FOREIGN PATENT DOCUMENTS

| | | | | |
|---|---|---|---|---|
| DE | 199 05 112 A1 | 8/2000 | .......... | F02B/37/06 |
| EP | 1 347 158 A1 | 9/2003 | .......... | F02B/37/04 |
| EP | 1 391 595 A1 | 2/2004 | .......... | F02B/37/04 |
| JP | A 2001-518590 | 10/2001 | .................. | 60/608 |
| WO | WO 99/17008 | 4/1999 | .................. | 60/608 |
| WO | WO 2004/025097 A1 | 3/2004 | .......... | F02B/37/04 |

* cited by examiner

Primary Examiner—Thai-Ba Trieu
(74) Attorney, Agent, or Firm—Oliff & Berridge PLC

(57) ABSTRACT

A control apparatus for an internal combustion engine in accordance with the invention includes a supercharger, a bypass passage, a flow amount adjustment device, an operational state detection portion, and a driving time determination portion. The supercharger is connected to an intake passage of an internal combustion engine and is driven by a motor. The bypass passage is provided for the intake passage in such a manner as to bypass the supercharger. By being driven electrically, the flow amount adjustment device can arbitrarily adjust a flow amount of air flowing through the bypass passage. The operational state detection portion detects an operational state of the internal combustion engine. The driving time determination portion determines a time at which the flow rate adjustment device is driven based on a result of detection performed by the operational state detection portion.

13 Claims, 4 Drawing Sheets

CONTROL APPARATUS AND CONTROL METHOD FOR INTERNAL COMBUSTION ENGINE

INCORPORATION BY REFERENCE

The disclosure of Japanese Patent Application No. 2003-100590 filed on Apr. 3, 2003, including the specification, drawings and abstract is incorporated herein by reference in its entirety.

BACKGROUND OF THE INVENTION

1. Field of the Invention

The invention relates to a control apparatus/method for an internal combustion engine having a supercharger connected to an intake passage and driven by a motor.

2. Description of the Related Art

An attempt to provide an intake passage of an engine (internal combustion engine) with a motor-driven supercharger and to achieve a high output (or low fuel consumption) through supercharging performed by the supercharger has generally been made. Such an internal combustion engine is disclosed also in Published Japanese translation of a PCT application JP-T-2001-518590. In the internal combustion engine disclosed in Published Japanese translation of a PCT application JP-T-2001-518590, an intake passage is bifurcated into two branch flow passages, which are combined into one flow passage again. A supercharger driven by a motor is connected to one of the branch flow passages. A combined portion of the branch flow passages is provided with a switching valve that changes the branch flow passage from which intake air flows toward the downstream side. When the supercharger is operated, the switching valve opens the branch flow passage that is provided with the supercharger, and closes the branch flow passage that is not provided with the supercharger. On the contrary, when the supercharger is not operated, the switching valve closes the branch flow passage that is provided with the supercharger, and opens the branch flow passage that is not provided with the supercharger. In this manner, while the supercharger is prevented from causing a loss in intake air, the backflow of intake air is prevented.

The state of switching valve in the internal combustion engine disclosed in Published Japanese translation of a PCT application JP-T-2001-518590 mentioned above is changed in accordance with a difference between a pressure in each of branch pipes on the upstream side and a pressure in an intake pipe on the downstream side. If the switching valve is designed to make use of a differential pressure as described above, the state of the switching valve may be inappropriately changed and the flow of intake air may pause for a moment. For example, if the supercharger is stopped from performing supercharging, the state of the switching valve is changed after stoppage of the supercharger, and then the flow of air is generated in the branch pipe that is not provided with the supercharger. At this moment, the flow of intake air pauses, and the internal combustion engine may be operated discontinuously.

SUMMARY OF THE INVENTION

It is an object of the invention to provide a control apparatus/method for controlling an internal combustion engine including a motor-driven supercharger capable of optimally performing supercharging in accordance with an operational state.

A first aspect of the invention relates to a control apparatus for an internal combustion engine including a supercharger connected to an intake passage of the internal combustion engine and driven by a motor; a bypass passage which is provided for the intake passage in such a manner as to bypass the supercharger; a flow amount adjustment device that arbitrarily adjusts a flow amount of air flowing through the bypass passage by being driven electrically; an operational state detection portion detects an operational state of the internal combustion engine; and a driving time decision portion that decides a time at which the flow amount adjustment device is driven, based on a result of detection performed by the driving time decision portion.

A second aspect of the invention relates to a control method for an internal combustion engine which includes a supercharger and a bypass passage which is provided for the intake passage in such a manner as to bypass the supercharger. This control method includes a step of detecting an operational state of the internal combustion engine; and a step of deciding a time at which the bypass passage is closed, based on the detected operational state.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
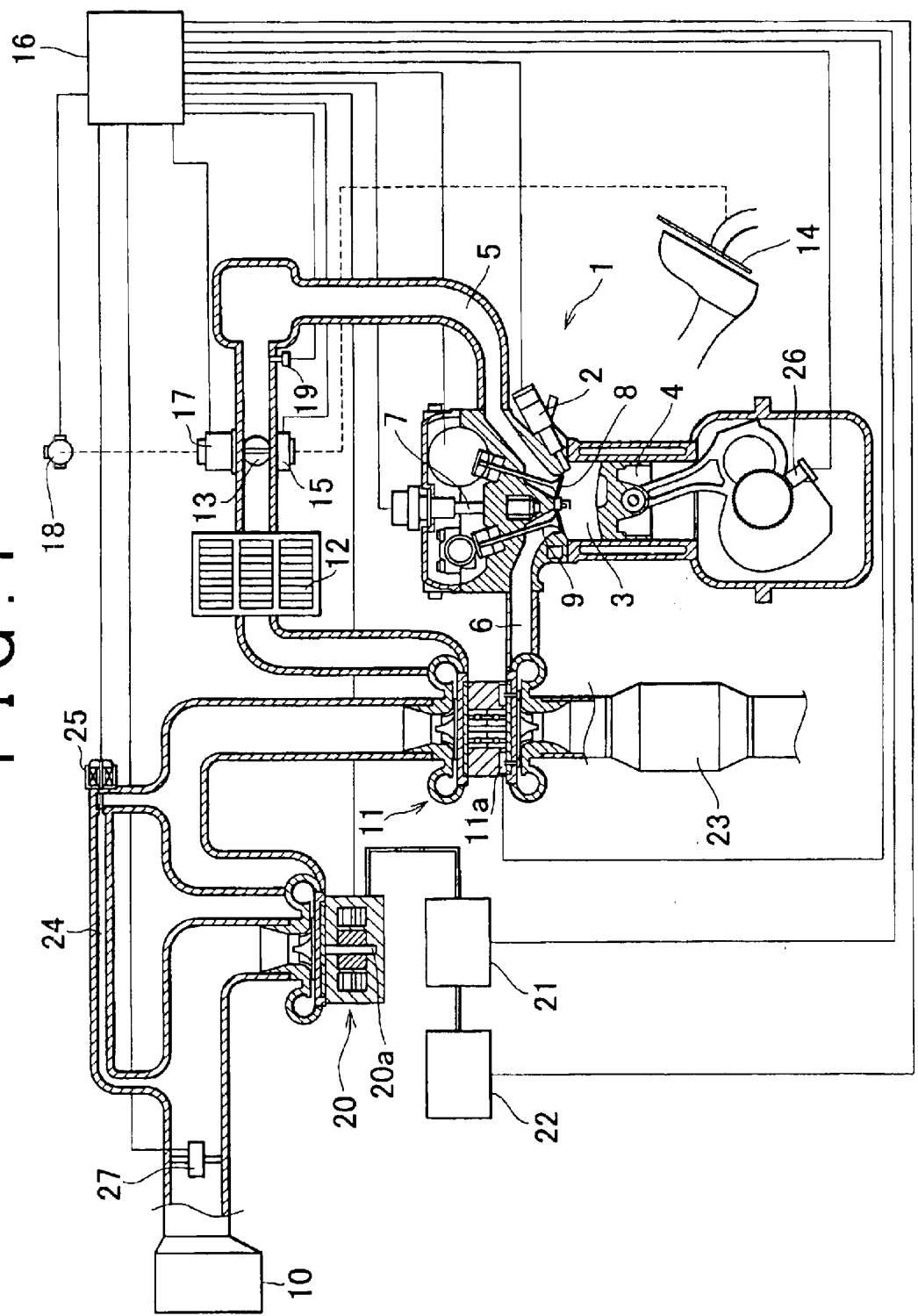
FIG. 1 is a diagram showing a configuration of an internal combustion engine including a control apparatus according to an embodiment of the invention.

A control apparatus in accordance with an embodiment of the invention will be described hereinafter. FIG. 1 shows an engine 1 having the control apparatus in accordance with the embodiment.

Although the engine 1 described in the embodiment is a multi-cylinder engine, only one cylinder is illustrated in FIG. 1 as a cross-sectional view. The engine 1 is designed to inject fuel into a cylinder 3 by means of an injector 2. The engine 1 is a so-called lean-burn engine in which stratified combustion is possible as well. The engine 1 can achieve a reduction in fuel consumption as well as an enhancement of output by supercharging a larger amount of intake air by means of a turbocharger (turbo unit) 11 and a supercharger 20 driven by an after-mentioned motor 20a.

The engine 1 can compress air taken into the cylinder 3 via an intake passage 5 by means of a piston 4, inject fuel into a dent formed in an upper face of the piston 4, gather a high-concentration mixture around an ignition plug 7, and burn the mixture by igniting it with the ignition plug 7 (stratified combustion). If fuel is injected during an intake stroke, normal homogeneous combustion can be carried out as well. A space between the interior of the cylinder 3 and the intake passage 5 is opened and closed by an intake valve 8. Exhaust gas produced after combustion is discharged to an exhaust passage 6. A space between the interior of the cylinder 3 and the exhaust passage 6 is opened and closed by an exhaust valve 9. An air cleaner 10, an air flow meter 27, a supercharger 20, a turbo unit 11, an intercooler 12, a throttle valve 13 and the like are disposed in the intake passage 5 and in this order from an upstream side thereof.

The air cleaner 10 removes dirt, dust and the like from intake air. The air flow meter 27 of the embodiment is of hot-wire type and detects an intake air amount as a mass flow amount. The supercharger 20 is electrically driven by the motor 20a that is built therein. A compressor wheel is directly connected to an output shaft of the motor 20a. The motor 20a of the supercharger 20 is connected to a battery 22 via a controller 21. The controller 21 controls the driving of the motor 20a by controlling the power supplied thereto. The controller 21 can detect a rotational speed of the motor 20a (i.e., a rotational speed of the compressor wheel).

A bypass passage 24 is so provided as to connect upstream and downstream sides of the supercharger 20. Namely, in this section, the intake passage 5 is bifurcated into two flow passages extending in parallel. A valve 25 for adjusting an amount of intake air flowing through the bypass passage 24 is connected to the bypass passage 24. The valve 25 of the embodiment adjusts an amount of intake air through duty control. As a matter of course, the valve 25 can also be maintained in a fully open state or a fully closed state. That is, the amount of the intake air flowing through the bypass passage 24 per unit time can be adjusted by the valve 25. The valve 25 functions as flow amount adjustment means. The valve 25 is electrically driven and can arbitrarily adjust an amount of air flowing through the bypass passage 24.

When the supercharger 20 is not operated, it acts as a resistance against intake air. In such a case, intake air is caused to flow through the bypass passage, so that the supercharger 20 is prevented from serving as a resistance against intake air. On the contrary, if the bypass passage is left open when starting the supercharger 20, intake air supercharged by the supercharger 20 flows backwards via the bypass passage 24. For this reason, the bypass passage 24 is closed. If the supercharger 20 has finished supercharging, the bypass passage 24 that is closed (or that allows only a limited amount of intake air to flow therethrough) is opened.

However, if the bypass passage 24 is simply closed or opened in accordance with the driving or stoppage of the supercharger 20, the flow of intake air tends to pause. This is not desirable from the standpoint of the output performance or exhaust emission properties of the engine 1. In the embodiment, therefore, the driving of the valve 25 is so controlled as to prevent the flow of intake air from pausing, so that optimal supercharging is carried out. This control will be described later in detail.

The turbo unit 11 is disposed between the intake passage 5 and the exhaust passage 6 and performs supercharging. That is, the engine 1 of the embodiment can perform supercharging by means of the supercharger 20 and the turbo unit 11 that are disposed in series. In the turbo unit 11, a turbine-side impeller and a compressor-side impeller are coupled by a rotational shaft. An air-cooled intercooler 12 disposed downstream of the turbo unit 11 is connected to the intake passage 5. The intercooler 12 lowers a temperature of intake air that has risen in temperature owing to an increase in pressure resulting from the supercharging performed by the supercharger 20 or the turbo unit 11. The intercooler 12 lowers a temperature of intake air and thus enhances filling efficiency.

A throttle valve 13 for adjusting an amount of intake air taken to the engine 1 is disposed downstream of the intercooler 12. The throttle valve 13 of the embodiment is a so-called electronically controlled throttle valve. An accelerator positioning sensor 15 detects an operation amount of an accelerator pedal 14. On the basis of a result of detection performed by the accelerator positioning sensor 15 and information obtained from other sensors, the ECU 16 determines an opening amount of the throttle valve 13. The throttle valve 13 is opened and closed by a throttle motor 17 that is disposed in association therewith. A throttle positioning sensor 18 for detecting an opening amount of the throttle valve 13 is also disposed in association therewith.

A pressure sensor 19 for detecting a pressure (supercharging pressure or intake pressure) in the intake passage 5 is also disposed downstream of the throttle valve 13. The sensors 15, 18, 19 and 27 are connected to the ECU 16. Results of detection performed by the sensors are delivered to the ECU 16. The ECU 16 is an electronic control unit that is composed of a CPU, a ROM, a RAM and the like. The aforementioned components such as the injector 2, the ignition plug 7, the controller 21, the battery 22 and the like are connected to the ECU 16. These components are controlled by signals output from the ECU 16, or states of the components (e.g., a charging state of the battery 22) are monitored by the ECU 16. That is, the ECU 16 functions as operational state detection means for detecting the operational state of the engine 1.

The valve 25 provided in the bypass passage 24 is also connected to the ECU 16. The valve 25 is electrically driven by a signal output from the ECU 16. That is, the ECU 16 functions as driving time decision means for deciding a time at which the valve 25 is driven. The ECU 16 detects an operational state of the engine 1 from results of detection performed by the sensors or the like, and drives the valve 25 on the basis of the results of detection. The air flow meter 27 functions as intake air amount detection means for detecting an intake air amount on the upstream side of the bypass passage.

On the other hand, the exhaust passage 6 is provided with an exhaust gas purification catalyst 23 for purifying exhaust gas. The exhaust gas purification catalyst 23 is disposed downstream of the turbo unit 11. A crank positioning sensor 26 for detecting a rotational position of a crank shaft of the engine 1 is installed in the vicinity thereof. The crank positioning sensor 26 can also detect an engine speed based on a position of the crank shaft.

The above-mentioned control of the supercharger 20 and the valve 25 will now be described. FIG. 2 shows a flowchart of this control. Referring to the flowchart shown in FIG. 2, it will be described how the valve 25 adjusts a flow amount. The control that will be described below is performed especially when starting supercharging that is performed by the supercharger 20. Namely, the valve 25 keeps the bypass passage 24 open before a routine of the flowchart shown in FIG. 2 is started.

Figure 2A:
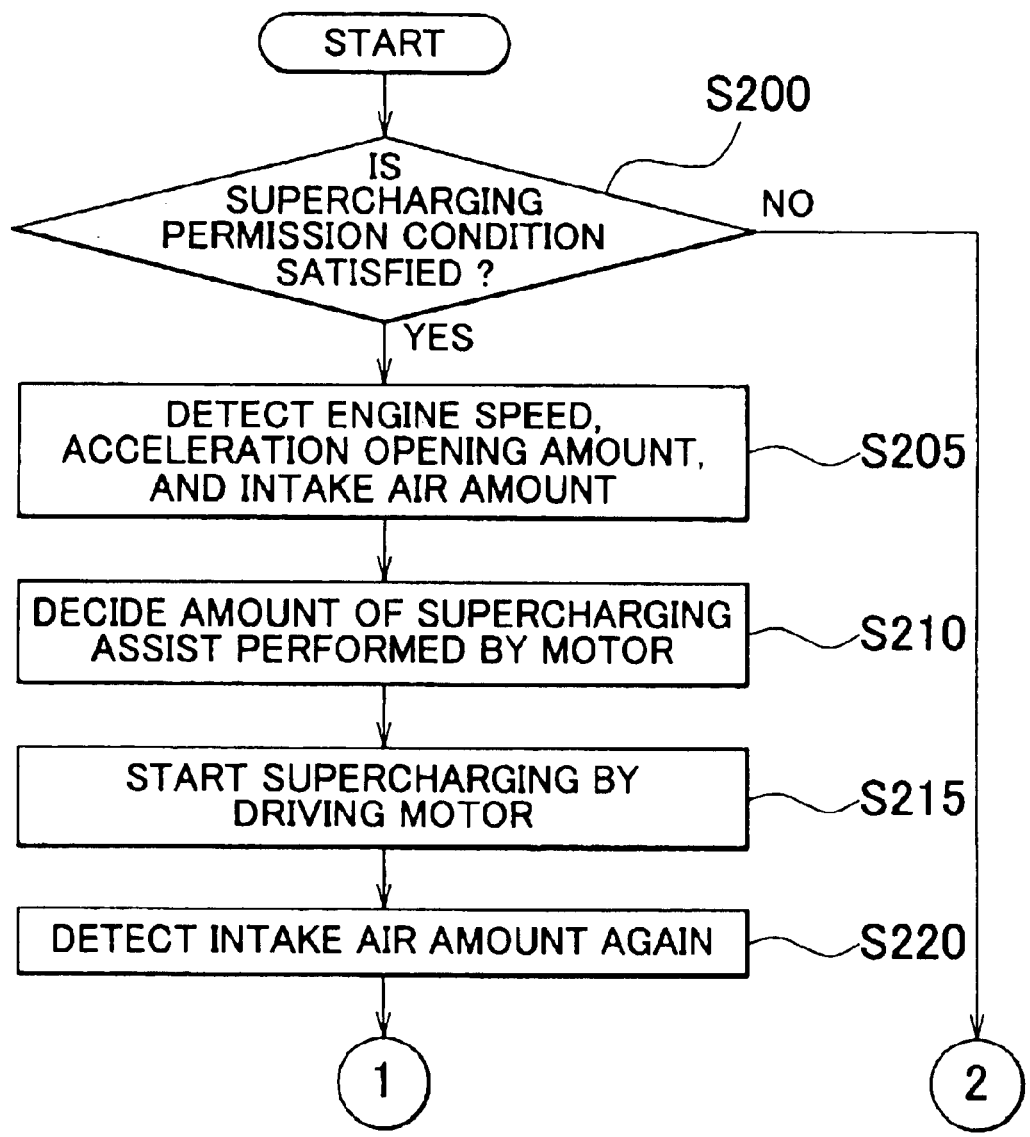
FIGS. 2A and 2B are a flowchart of a valve control performed by the control apparatus according to the embodiment of the invention.
Figure 2B:
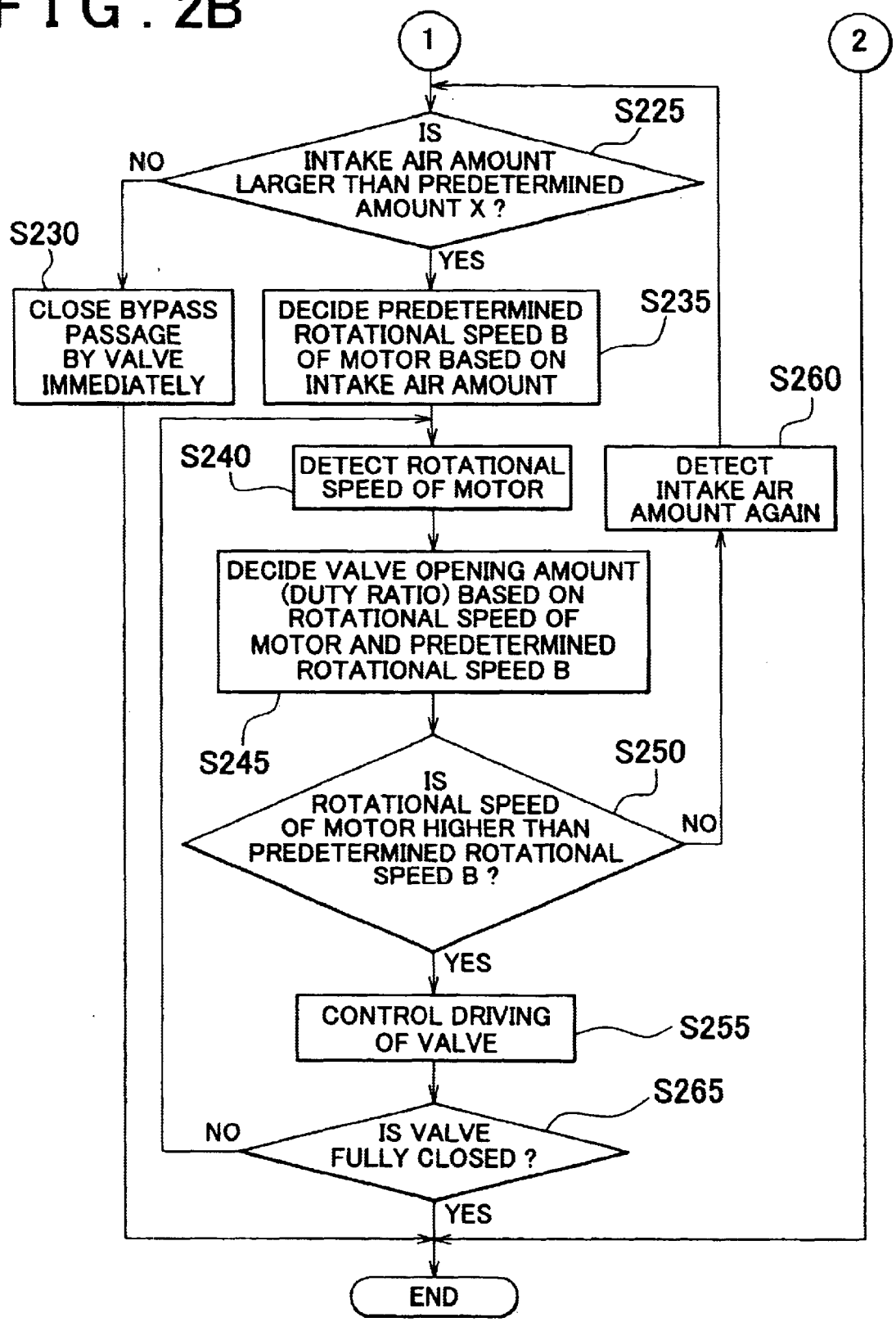

First, it is determined whether a basic condition for performing supercharging using the supercharger 20 (supercharging permission condition) is satisfied (step 200). An example of the permission condition is a condition that the motor 20a can operate normally. If a negative determination is made in step 200, supercharging using the supercharger 20 is not performed, and the routine shown in the flowchart in FIGS. 2A and 2B are finished. The state of the valve 25 at this time is maintained such that the bypass passage 24 in which the supercharger 20 is not provided is kept open.

If an affirmative determination is made in step 200, the engine speed, the accelerator opening amount, and the intake air amount are detected (step 205). The crank positioning sensor 26 detects the engine speed, the accelerator positioning sensor 15 detects the accelerator opening, and the air flow meter 27 detects the intake air amount. The engine load can be calculated based on the detected accelerator opening amount and the intake air amount. Then, an amount of supercharging assist performed by the supercharger 20 (hereinafter, referred to as "supercharging assist amount") is decided based on the detected values and the calculated values (step 210). The supercharging assist amount is obtained considering the supercharging effect of the turbocharger 11 on the downstream side of the supercharger 20. In other words, the supercharging assist amount is an assist amount shared by the supercharger 20.

Based on the decided supercharging assist amount, supercharging by the supercharger 20 is started by driving the motor 20a (step 215). The intake air amount is detected again (step 220), and it is determined whether the detected intake air amount is larger than a predetermined amount X (step 225). When a negative determination is made in step 225, that is, when the detected intake air amount is equal to or smaller than the predetermined amount X, the bypass passage 24 is blocked by driving the valve 25 (step 230) because a pressure loss caused by flowing of the intake air through the supercharger 20 is minute even when the supercharger 20 is not driven. The predetermined amount X is set as a small intake air amount (intake air amount on the upstream side of the bypass passage) such that the flow of intake air does not pause if the bypass passage 24 is blocked immediately. Note that when the intake air amount detected by the air flow meter 27 is equal to or smaller than the predetermined amount X, the amount of intake air flowing through the bypass passage 24 is equal to or smaller than the predetermined amount X.

In the case where the amount of intake air flowing through the bypass passage 24 is equal to or larger than a certain amount, when the bypass passage 24 is abruptly closed, the intake air from the bypass passage 24 is stopped before the intake air amount supplied by supercharging performed by the supercharger 20 is sufficiently increased. Therefore, the flow of intake air pauses. Thus, the valve 25 is immediately closed only when the detected intake air amount is sufficiently small such that the flow of intake air does not pause if the bypass passage 24 is immediately blocked (that is, only when a negative determination is made in step 225). When an affirmative determination is made in step 225 and the detected intake air amount is larger than the predetermined amount X, a predetermined rotational speed B of the motor 20a is decided based on the detected intake air amount (step 235).

Figure 3:
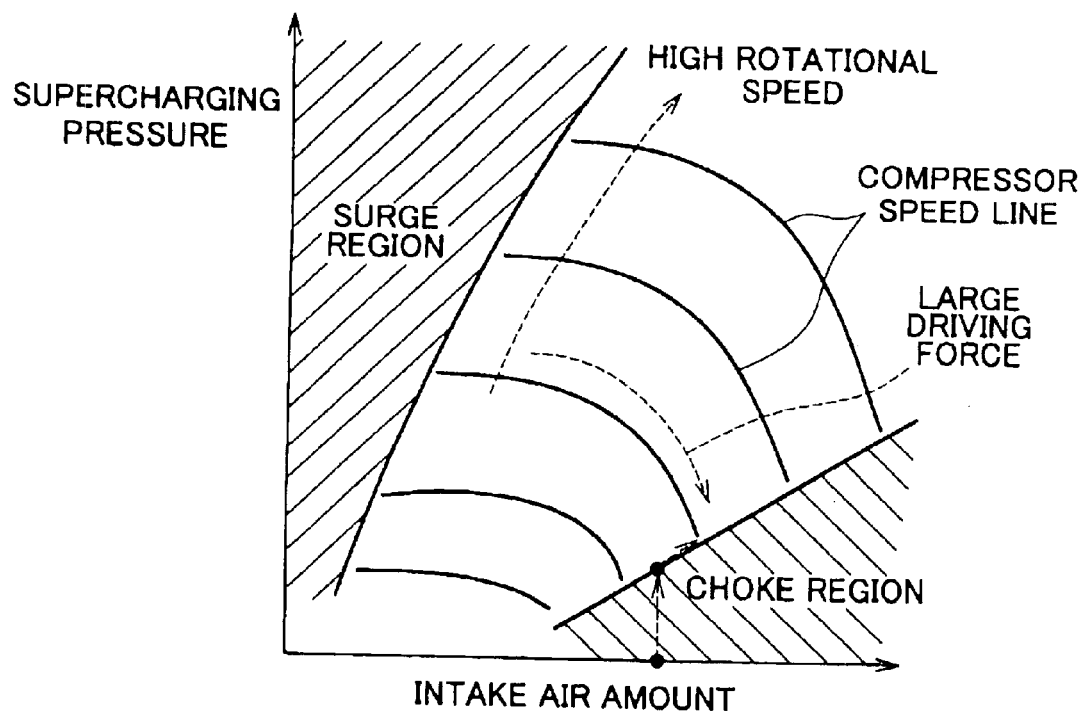
FIG. 3 is a map which is used when deciding a predetermined rotational speed of a motor.

At this time, the map shown in FIG. 3 is used. FIG. 3 is a map in which a transverse axis indicates the intake air amount, and a horizontal axis indicates the supercharging pressure. In the map, lines each of which indicates the same rotational speed of the compressor (hereinafter, referred to as "compressor speed line") are described. The upper compressor speed line indicates a higher rotational speed. Also, as the intake air amount increases along the compressor speed line, the driving force output by the engine 1 increases. As apparent from the map, as the intake air amount increases along the compressor speed line indicating a certain speed, the supercharging pressure decreases. This shows that when the intake air amount increases to a certain amount, supercharging efficiency starts to deteriorate, and finally compressor choke occurs in the case where the rotational speed is fixed. A compressor choke region is shown by hatching in a lower right portion of the map. When control is performed such that supercharging is not performed by the supercharger 20 in this region. In addition, control is performed such that supercharging is not performed by the supercharger 20 in a compressor surge region shown by hatching in a left portion of the map.

Based on the detected intake air amount, a point of intersection of the intake air amount and a border line of the compressor choke region is obtained. Then, the compressor speed line on a high speed side, which is closest to the point of intersection, is obtained. The aforementioned predetermined rotational speed B is set to the rotational speed indicated by the compressor speed line. Next, the rotational speed of the motor 20a (i.e., the rotational speed of the compressor turbine) at this time is detected (step 240). The rotational speed of the motor 20a is detected by the controller 21. Then, the duty ratio of the valve 25 is decided based on the rotational speed of the motor 20a detected in step 240 and the predetermined rotational speed B decided in step 235 such that the flow amount in the bypass passage 24 is decreased gradually or stepwise (step 245). The flow amount in the bypass passage 24 may be decreased by the valve 25 continuously and gradually or stepwise.

Then, it is determined whether the actual rotational speed of the motor 20a is higher than the predetermined rotational speed B (step 250). When an affirmative determination is made in step 250, it can be determined that the flow of intake air has been sufficiently generated by the supercharger 20, and the flow of intake air does not pause if the bypass passage 24 starts to be closed. In other words, when an affirmative determination is made in step 250, it can be considered that the amount of intake air flowing through the supercharger 20 is equal to the amount of intake air flowing through the bypass passage 24. The phrase "the amount of intake air flowing through the supercharger 20 is equal to the amount of intake air flowing through the bypass passage 24" signifies that it is possible to obtain, only by the supercharger 20, the intake air of the amount which is the same as the amount of air inhaled through the bypass passage 24 immediately before supercharging by the supercharger 20 is started. Thus, when an affirmative determination is made in step 250, the valve 25 is driven based on the decided duty ratio (step 255).

When a negative determination is made in step 250, it can be determined that the flow of intake air has not been sufficiently generated by the supercharger 20, and the flow of intake air may pause if the bypass passage 24 is closed. In other words, when an affirmative determination is made in step 250, it can be determined that the amount of intake air flowing through the supercharger 20 has not become equal to the amount of intake air flowing through the bypass passage 24. In this case, after the intake air is detected again (step 260), the routine returns to step 225, and the control is repeatedly performed.

When an affirmative determination is made in step 250 and the valve 25 is driven, it is determined whether the present control duty ratio is a control duty ratio at which the valve 25 is fully closed (step 265). When an affirmative determination is made in step 265 and the valve 25 is fully closed, it can be determined that the flow passage through which the intake air flows is completely changed from the bypass passage 24 to the flow passage to which the supercharger 20 is connected. Therefore, the routine shown in the flowchart in FIGS. 2A and 2B is finished. When a negative determination is made in step 265 and the valve 25 has not become fully closed, the rotational speed of the motor 20a is detected again (step 240), the duty ratio is redecided (step 245). In this case, since the actual rotational speed of the motor 20a is gradually increased, the decided duty ratio is gradually changed so as to be close to the duty ratio at which the valve 25 is fully closed. Then, finally the valve 25 is fully closed, and an affirmative determination is made in step 265.

Further, the aforementioned turbo unit 11 may include a variable geometry mechanism. The turbo unit 11 in FIG. 1 includes a variable nozzle mechanism 11a as the variable geometry mechanism. The variable nozzle mechanism 11a is controlled by the ECU 16. That is, the ECU 16 functions as a control portion for the variable geometry mechanism. The turbo unit 11 provided on the downstream side of the supercharger 20 may be a variable nozzle turbo in which the turbine output obtained by changing the area of an inlet opening portion through which exhaust gas flows into the turbine is controlled to be variable. In this case, it is preferable to perform control that prohibits the area of the inlet opening portion, through which intake air flows into the turbine, from becoming minimum when supercharging is performed. A back pressure can be reduced by prohibiting the area of the inlet opening of the variable nozzle, through which exhaust gas flows into the turbine, from becoming minimum, and accordingly the amount of air taken into the engine 1 can be increased. Thus, the effect of supercharging performed by the supercharger 20 can be sufficiently obtained.

The invention is not limited to the aforementioned embodiment. For example, in the aforementioned embodiment, the flow amount is adjusted by controlling the duty ratio for opening/closing the valve 25, which is the flow amount adjustment means (flow amount adjustment device). However, the flow amount may be adjusted by adjusting an opening amount of the flow amount adjustment means (flow amount adjustment device) such as a throttle valve 13. Also, in the aforementioned embodiment, the pressure sensor 19 and the air flow meter 27 are used. However, the air flow meter 27 does not necessarily need to be provided as long as a system which can estimate the intake air amount based on the pressure in the intake pipe can be configured.

Also, in the aforementioned embodiment, when the detected intake air amount is equal to or smaller than the predetermined amount X, the valve 25 becomes fully closed immediately. However, the valve 25 may become fully closed based on information other than the intake air amount, which is obtained from the sensors. For example, it may be determined whether the valve 25 should become fully closed or the valve 25 should become closed gradually (or stepwise), based on the engine speed and/or the supercharging pressure.

Further, in the aforementioned embodiment, when the rotational speed of the motor 20a becomes equal to the predetermined rotational speed B, it is determined that the amount of intake air flowing through the supercharger 20 becomes equal to the amount of intake air flowing through the bypass passage 24. Also, the predetermined rotational speed B is decided based on the intake air amount. However, the intake air amount may be decided based on the engine speed and the engine load, instead of the intake air amount.

In the control apparatus for an internal combustion engine of the aforementioned embodiment, the operational state of the internal combustion engine is detected by the operational state detection means (operational state detection portion), and the amount of intake air flowing through the bypass passage is adjusted electrically and arbitrarily by controlling the flow amount adjustment means (flow amount adjustment device) based on the results of detection performed by the operational state detection means. Thus, the amount of intake air flowing through the bypass passage can be accurately controlled according to the operational state of the internal combustion engine, and thus optimal supercharging can be performed by the motor-driven supercharger. Also, backflow of intake air can be reliably prevented when supercharging is performed using the motor.

Also, the flow amount adjustment means (flow amount adjustment device) starts to be driven such that the bypass passage is closed, when the amount of intake air flowing through the supercharger becomes equal to the amount of intake air flowing through the bypass passage. Therefore, the flow of intake air has been sufficiently generated, and accordingly the flow of intake air does not pause if the bypass passage starts to be closed. As a result, supercharging can be smoothly performed by the supercharger without making the operation of the internal combustion engine unstable.

Also, it is determined, based on the rotational speed of the supercharger, when the amount of intake air flowing through the supercharger becomes equal to the amount of intake air flowing through the bypass passage. Therefore, it can be detected that the amount of intake air flowing through the supercharger becomes equal to the amount of intake air flowing through the bypass passage using the simpler configuration.

Also, the predetermined rotational speed of the supercharger, which is used for determining when the amount of intake air flowing through the supercharger becomes equal to the amount of intake air flowing through the bypass passage, is decided based on the intake air amount. Alternatively, the predetermined rotational speed of the supercharger, which is used for determining when the amount of intake air flowing through the supercharger becomes equal to the amount of intake air flowing through the bypass passage, is decided based on the engine speed and the engine load. By making the predetermined rotational speed variable, it is possible to more accurately determine when the amount of intake air flowing through the supercharger becomes equal to the amount of intake air flowing through the bypass passage. As a result, supercharging can be performed by the supercharger more smoothly.

Also, the bypass passage is closed immediately after supercharging by the supercharger is started in the case where the amount of intake air flowing through the bypass passage is equal to or smaller than the predetermined value when the supercharging by the supercharger is started. In the case where the amount of intake air flowing through the bypass passage is equal to or smaller than the predetermined value when the supercharging by the supercharger is started, it can be determined that the amount of the intake air flowing through the bypass passage is sufficiently small such that the flow of intake air does not pause even if the bypass passage is closed immediately. In this case, the flow passage through which the intake air flows can be completely changed early from the bypass passage to the flow passage to which the supercharger is connected.

Also, the flow passage through which the intake air flows is changed from the bypass passage to the flow passage to which the supercharger is connected gradually or stepwise by closing the bypass passage gradually or stepwise, instead of closing the bypass passage immediately. Thus, supercharging by the supercharger can be smoothly started. Also, the internal combustion engine can be more reliably prevented from becoming unstable due to pause of the flow of intake air.

Also, the variable geometry turbo is provided downstream of the motor-driven supercharger. In the case where the area of the inlet opening portion through which exhaust gas flows into the turbine is controlled, the area of the inlet opening portion is prohibited from becoming minimum when supercharging is performed by the supercharger. Thus, the back pressure is reduced when supercharging is performed by the supercharger. As a result, it is possible to obtain a more amount of intake air, and to reliably obtain the effect of supercharging performed by the supercharger.

What is claimed is:

1. A control method for an internal combustion engine which includes a supercharger and a bypass passage which is provided for the intake passage in such a manner as to bypass the supercharger, comprising:

detecting an operational state of the internal combustion engine by determining whether an amount of intake air flowing through the supercharger becomes equal to amount of intake air flowing through the bypass passage; and deciding a time at which the bypass passage is closed, based on the detected operational state, so as to start to close the bypass passage when the amount of intake air flowing through the supercharger becomes equal to the amount of intake air flowing through the bypass passage after supercharging by the supercharger is started.

2. A control method for an internal combustion engine which includes a supercharger driven by a motor, a bypass passage which is provided for the intake passage in such a manner as to bypass the supercharger, and a variable geometry turbocharge which is provided on a downstream side of the supercharger connected to the intake passage, comprising:

detecting an operational state of the internal combustion engine;

deciding a time at which the bypass passage is closed, based on the detected operational state; and controlling an area of an inlet opening portion through which exhaust gas flows into a turbine of the variable geometry turbocharger, wherein the controlling includes prohibiting the area of the inlet opening portion, through which exhaust gas flows into the turbine, from becoming a minimum when supercharging is performed using the motor of the supercharger.

3. A control apparatus for an internal combustion engine, comprising:

a supercharger connected to an intake passage of the internal combustion engine and driven by a motor;

a bypass passage which is provided for the intake passage in such a manner as to bypass the supercharger;

a flow amount adjustment device which arbitrarily adjusts a flow amount of air flowing through the bypass passage by being driven electrically;

an operational state detection portion which detects an operational state of the internal combustion engine, the operational state detection portion determines whether an amount of intake air flowing through the supercharger becomes equal to an amount of intake air flowing through the bypass passage; and a driving time decision portion which decides a time at which the flow amount adjustment device is driven, based on a result of detection performed by the operational state detection portion, the driving time decision portion starts to drive the flow amount adjustment device so as to close the bypass passage when the amount of intake air flowing through the supercharger becomes equal to the amount of intake air flowing through the bypass passage after supercharging by the supercharger is started.

4. The control apparatus according to claim 3, wherein the operational state detection portion determines that the amount of intake air flowing through the supercharger becomes equal to the amount of intake air flowing through the bypass passage when a rotational speed of the supercharger reaches a predetermined rotational speed.

5. The control apparatus according to claim 4, further comprising an intake air amount detector that detects an intake air amount on an upstream side of the bypass passage, wherein the predetermined rotational speed is decided based on the intake air amount detected by the intake air amount detector.

6. The control apparatus according to claim 4, wherein the operational state detection portion detects an engine speed and an engine load of the internal combustion engine, and the predetermined rotational speed is decided based on the detected engine speed and the detected engine load.

7. The control apparatus according to claim 3, wherein the driving time decision portion drives the flow amount adjustment device so as to close the bypass passage immediately after the supercharging by the supercharger is started in a case where the amount of intake air flowing through the bypass passage is equal to or smaller than a predetermined value when the supercharging is started.

8. The control apparatus according to claim 3, wherein the driving time decision portion drives the flow amount adjustment device so as to decrease the amount of air flowing through the bypass passage gradually or stepwise until the bypass passage is completely closed after the supercharging by the supercharger is started.

9. The control apparatus according to claim 8, wherein the flow amount adjustment device includes a valve which opens and closes the bypass passage, and the driving time decision portion decides a speed at which the valve is closed, based on an actual rotational speed of the motor and a predetermined rotational speed.

10. The control apparatus according to claim 3, further comprising a controller that controls the motor for the supercharger, wherein the controller gradually increases the rotational speed of the motor until the bypass passage is completely closed after the supercharging is started.

11. The control apparatus according to claim 3, wherein the flow amount adjustment device is provided in the bypass passage at a portion on an upstream side of a portion at which the intake passage and the bypass passage are combined.

12. A control apparatus for an internal combustion engine, comprising:

a supercharger connected to an intake passage of the internal combustion engine and driven by a motor;

a bypass passage which is provided for the intake passage in such a manner as to bypass the supercharger;

a flow amount adjustment device which arbitrarily adjusts a flow amount of air flowing through the bypass passage by being driven electrically;

an operational state detection portion which detects an operational state of the internal combustion engine;

a driving time decision portion which decides a time at which the flow amount adjustment device is driven, based on a result of detection performed by the operational state detection portion.

a variable geometry turbocharger which is provided on a downstream side of the supercharger connected to the intake passage; and a control portion which controls an area of an inlet opening portion through which exhaust gas flows into a turbine of the variable geometry turbocharger, wherein the control portion prohibits the area of the inlet opening portion, through which exhaust gas flows into the turbine, from becoming a minimum when supercharging is perform using the motor.

13. The control apparatus according to claim 12, wherein the flow amount adjustment device is provided in the bypass passage at a portion on an upstream side of a portion at which the intake passage and the bypass passage are combined.

* * * * *